UNITED STATES PATENT OFFICE.

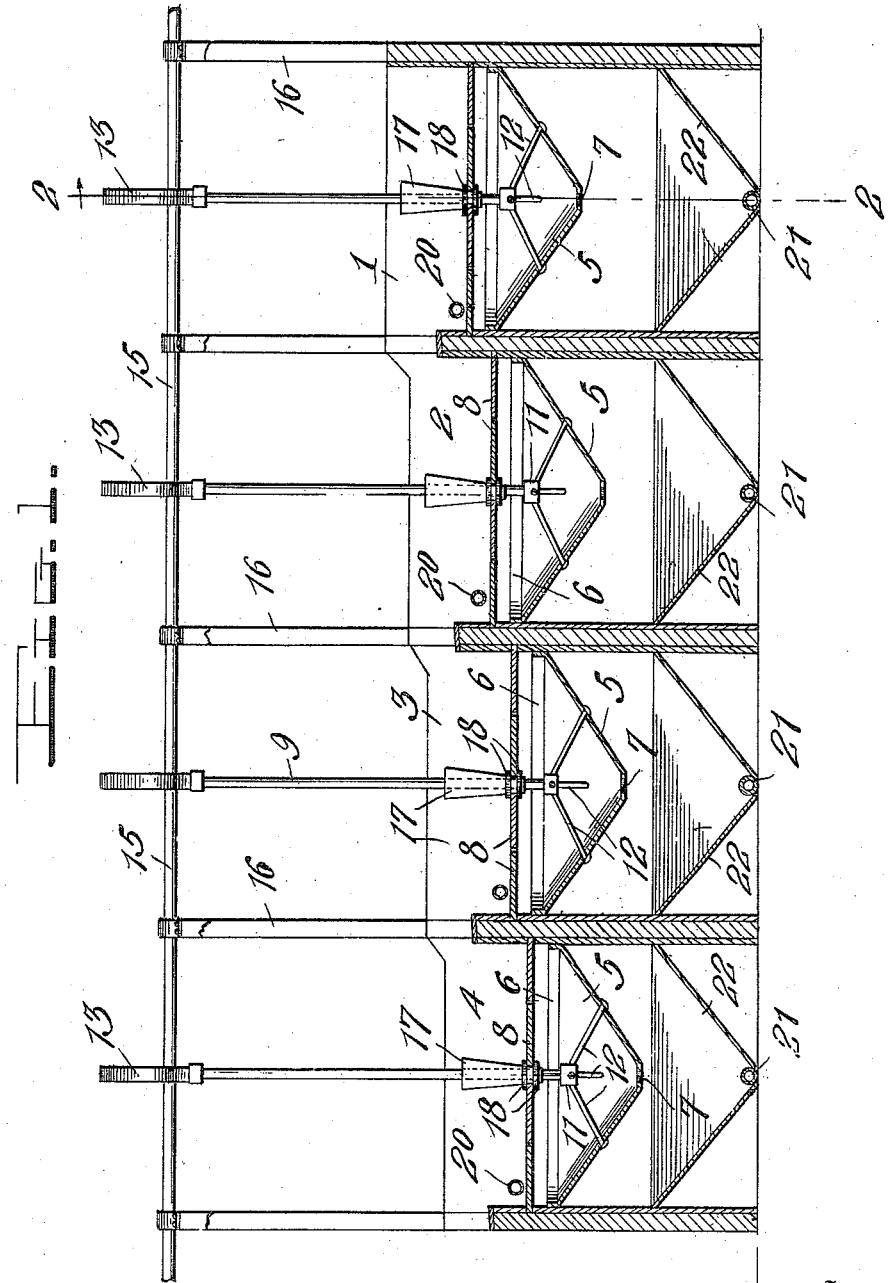

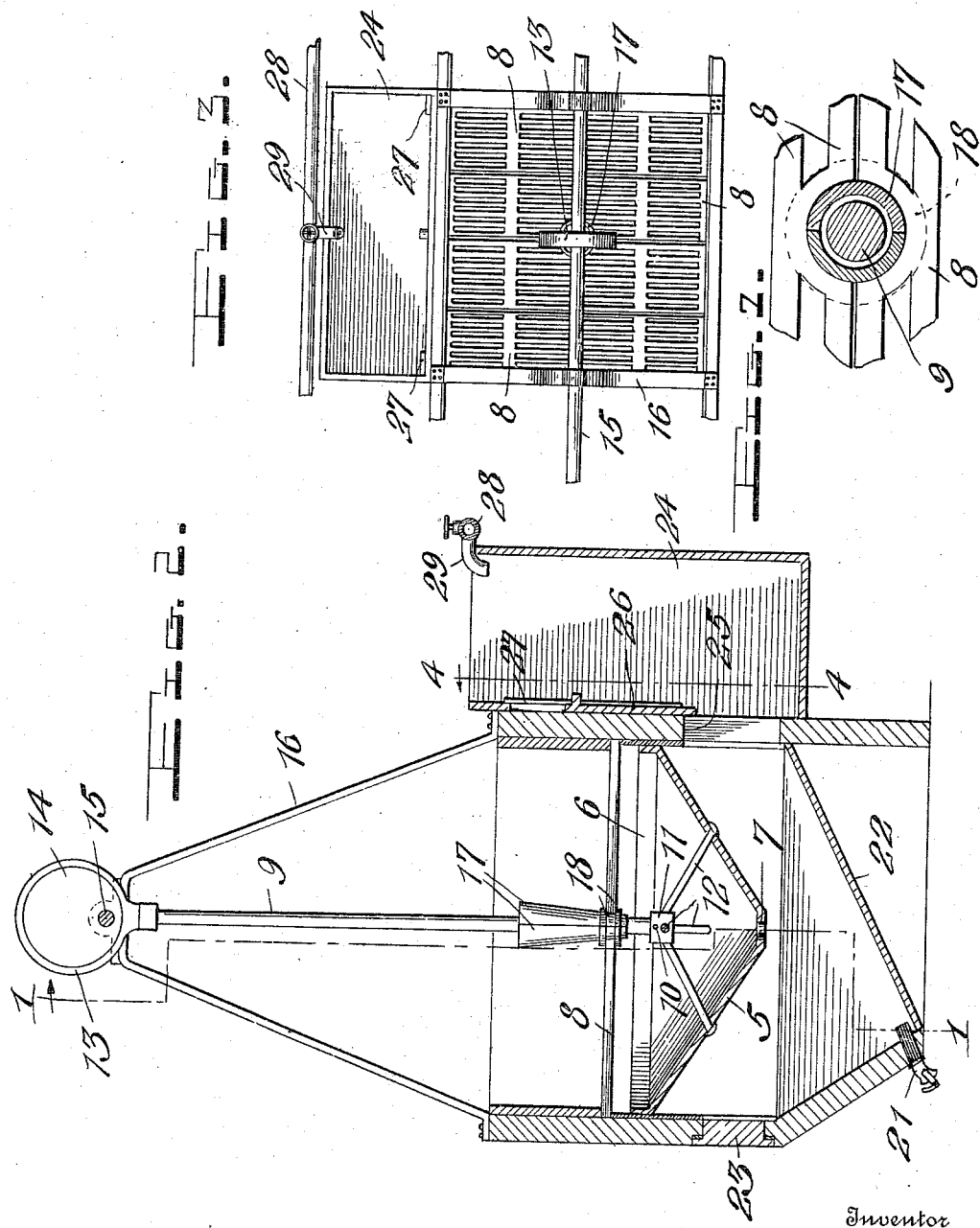

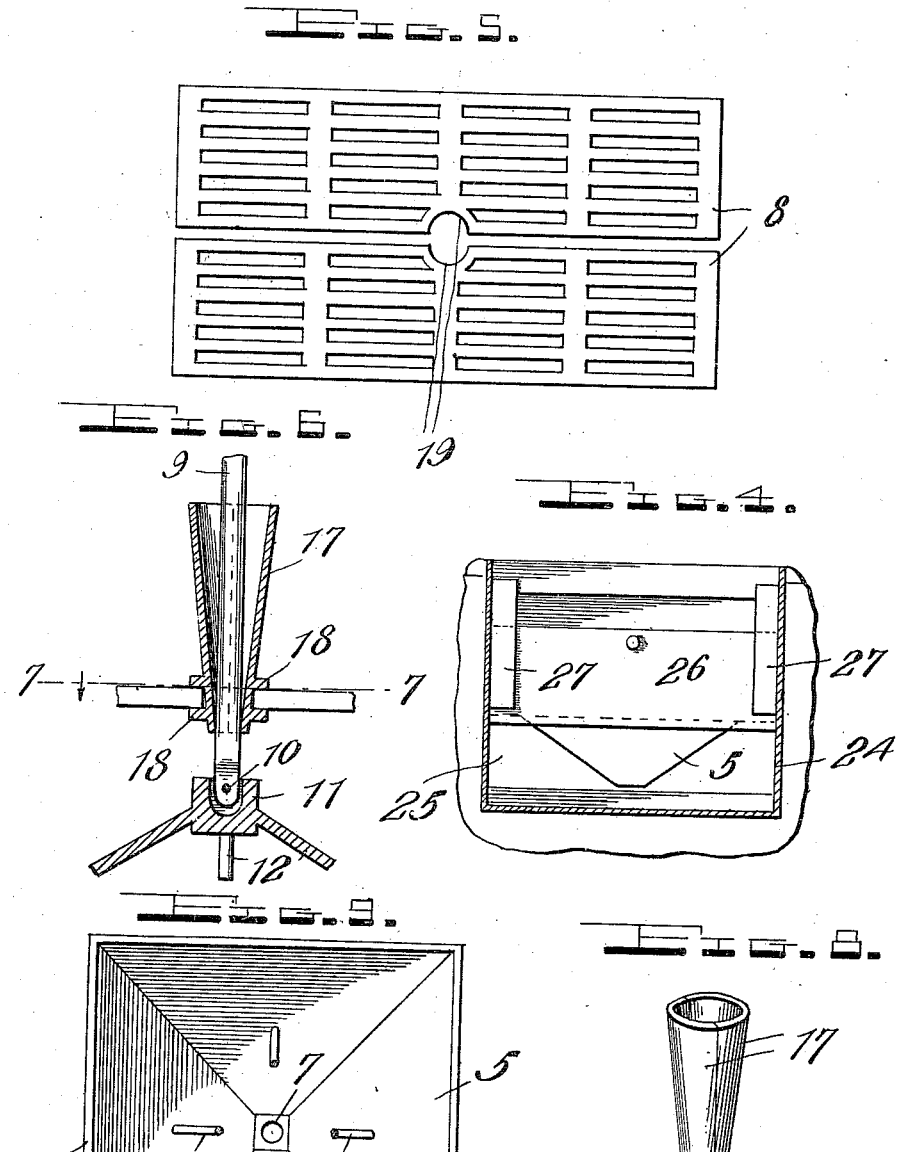

MELVIN DOUBLEDEE, OF JOPLIN, MISSOURI.

ORE-CONCENTRATING JIG.

973,180. Specification of Letters Patent. Patented Oct. 18, 1910.

Application filed January 22, 1910. Serial No. 539,480.

*To all whom it may concern:*

Be it known that I, MELVIN DOUBLEDEE, a citizen of Canada, having this 18th day of January, 1910, made application for citizenship in the United States, residing at Joplin, in the county of Jasper and State of Missouri, have invented certain new and useful Improvements in Ore-Concentrating Jigs, of which the following is a specification, reference being had to the accompanying drawings.

My invention relates to improvements in ore concentrating jigs.

The object of the invention is to provide a machine or apparatus of this character which will be more effective and economical in operation, and less expensive to construct, the above object being attained by the peculiar construction, arrangement and combination of parts as hereinafter fully described and claimed, and illustrated in the accompanying drawings in which:—

Figure 1 is a longitudinal section through a jig constructed in accordance with my invention, the plane of the section being indicated by the broken line 1—1 in Fig. 2; Fig. 2 is a vertical transverse sectional view taken on the plane indicated by the line 2—2 in Fig. 1; Fig. 3 is a detail top plan view of one of the cells or sections of the jigs; Fig. 4 is a detail section taken on the plane indicated by the line 4—4 in Fig. 2; Fig. 5 is a plan view of the two central grate or sieve sections showing them slightly separated; Fig. 6 is a detail section showing the tubular guide for the plunger rod or stem, and coacting parts; Fig. 7 is a detail section taken on the plane indicated by the line 7—7 in Fig. 6; Fig. 8 is a perspective view of the tubular guide; and Fig. 9 is a top plan view of the improved dished or concave plunger.

In the embodiment of the invention illustrated in Fig. 1, the jig is composed of a plurality of sections or cells 1, 2, 3, 4, each containing a separating grate or sieve, and the several grates or sieves being arranged in different horizontal planes as clearly shown in the drawings. The body or framework of the several sections or cells of the jig may be of ordinary or any approved construction, and the cells are preferably of square or rectangular shape when viewed from the top, each forming a separating chamber or compartment containing the grate or sieve and a reciprocatory plunger which works directly beneath the grate or sieve and which is preferably of dished or concave form with its hollow side uppermost. Since each of the cells is the same in construction a detail description of one will suffice for all. The plunger 5 is shown as of hollow pyramidal form and it is of such size as to fit the cell or compartment with which it reciprocates. Around its upper edge is formed a flange 6 to provide a bearing surface for contact with the walls of the cell or compartment for the purpose of preventing the concentrates from passing to the bottom of the cell around the sides of the plunger. In the bottom of the plunger is formed a central opening 7 which while permitting the concentrates to pass through the plunger to the bottom of the cell, will not interfere with the action of the plunger in forcing water upwardly through the grate or sieve 8.

The plunger is suspended and reciprocated by a rod or stem 9, the lower end of which is connected as shown at 10 to the hub or central portion of a spider 11, the arms 12 of which latter are suitably united to the plunger. The upper portion of the rod 9 is connected to an eccentric strap 13 surrounding an eccentric 14 on a longitudinal shaft 15 arranged centrally over the several cells and journaled in bearings on the upper portions of inverted U-shaped brackets which straddle the body portion of the jig, as shown more clearly in Fig. 2.

In order to prevent the ore and concentrates from working through the grate at the point where the rod 9 passes through it, and also to prevent a splashing of water I provide a tubular guide 17 which is secured centrally in and rises from the grate. This tubular guide is funnel-shaped with its large end uppermost, and in order to permit it to be readily applied and removed, it is preferably divided longitudinally into two similar half sections and adjacent its small lower end are provided spaced flanges 18 adapted to receive the grate between them. The grate 8 is also preferably made of a plurality of removable sections, four being shown and arranged transversely in the cell; and the two central ones are formed in their opposing edges with semicircular shaped seats or recesses 19, which latter are adapted to receive the portion of the tubular guide 17 which is between the flanges 18, as will be understood on reference to Figs. 5, 6, 7 and 8. By making the grate and guide in sections and providing the flanges 18 and recesses 19, it will be seen that the grate may be readily removed without disturbing the other parts of the jig. The usual draw-off outlet 20 is arranged in one side wall of the cell or compartment above the grate, and the concentrates which pass through the openings 7 in the plunger and settle on the bottom of the cell or compartment are drawn off by the usual discharge faucet 21 arranged at the lowest point in the cell or compartment. To cause the concentrates to work toward the faucet 21 the bottom of the cell or compartment is composed of a plurality of inclined surfaces 22 as is common in the construction of jigs. If desired, an opening may be formed in one side wall of the cell or compartment to permit of access to the lower portion of the latter, such opening being closed by a door 23 as indicated in Fig. 2. The ore is, of course, placed on the top of the grate and water may be supplied to the cell or compartment in any suitable manner but I preferably provide a supply compartment or laundry box 24 arranged on one side of the body of the jig and communicating with the lower portion of the compartment or cell through an opening or throat 25. The size of this throat 25 may be varied to control the operation of the jig, and this is preferably effected by a valve or gate 26 slidably mounted in vertical guides 27, as will be understood on reference to Figs. 2 and 4. Extending longitudinally along the several laundry boxes 24 is a water supply pipe 28 which contains faucets 29 adapted to discharge water into each of the several boxes.

In operation the shaft 15 is rotated by any suitable means and causes the eccentrics 14 to reciprocate the plungers 5 beneath the grates 8 so as to cause said plungers to lift water upwardly through the grates. It will be seen that by arranging the plungers close to and beneath the grates comparatively little water will need to be lifted, and at the same time a more even action is obtained on the bed of ore or pulp. This arrangement of the plunger not only causes the jig to move easier and require less power to operate, but also dispenses with the necessity of an extra compartment for the plunger so that the jig is exceedingly compact in construction and requires an exceedingly small amount of floor space. This peculiar construction and arrangement also enables the jigs to be built lower and with a much smaller quantity of material than the jigs now in general use, thus saving not only in the cost of material but also in the cost of building. The low construction of the jig is also advantageous in that it permits the operator to more readily observe the operation of the apparatus and to control, adjust and repair the several parts. The peculiar shape and construction of the plunger enables the concentrates to pass to the bottom of the cells or compartments without in any way affecting the efficiency of the jig, and the provision of the adjustable throat or inlet for the water enables the operation to be effectively regulated and controlled.

From the foregoing detail description taken in connection with the drawings it is thought that the construction, operation and advantages of the invention will be readily understood, and it will be further understood that while I have shown and described in detail the preferred embodiment of my invention I do not limit myself to the construction set forth, since changes in the form, proportion and arrangement of parts, and in the minor details may be resorted to within the spirit and scope of my invention.

Having thus described the invention, what is claimed is:

1. In a jig, the combination of a plunger compartment, a water supply compartment adjacent the latter, the two compartments being in communication adjacent their lower ends, an adjustable valve to control the opening which affords communication between the two compartments, a stationary grate in the plunger compartment above said inlet opening, a concave plunger mounted for reciprocation in the plunger compartment immediately beneath the grate and having its edges slidably engaged with the inner walls of said plunger compartment, said plunger being adapted to reciprocate across the upper portion of said inlet opening and having at its central lowermost point a single outlet opening for the concentrates, an upright tubular guide in the central portion of the grate, an elevated drive shaft disposed above the plunger compartment, a vertically disposed pitman rod operated from said shaft and extending downwardly through said tubular guide, and a spider uniting the lower end of said pitman rod to said plunger.

2. In a jig, the combination of a plunger compartment having a downwardly inclined bottom portion provided at its lower end with a valve controlled outlet, one wall of said plunger compartment being formed adjacent its bottom with an inlet opening, a water supply compartment communicating with said inlet opening, an adjustable valve to control said inlet opening, a stationary grate arranged horizontally in the plunger compartment above said inlet opening and composed of removable sections, adjacent sections being formed in the central portions of their opposing edges with semicircular recesses, a guide tube divided longitudinally in two sections, the latter having adjacent their lower ends spaced flanges to receive the recessed edges of said grate sections between them whereby the guide will be detachably secured in and supported by the grate, a concave plunger mounted for reciprocation in the plunger compartment immediately beneath the grate and having flanged edges slidably engaged with the walls of said compartment, one edge of said plunger being adapted to reciprocate across the upper portion of said inlet opening, and said plunger having in its central and lowermost portion an outlet opening for the concentrates, an elevated drive shaft, a plunger rod actuated from said shaft and extending through said guide, and a spider uniting the lower end of said plunger rod to the plunger.

3. In a jig, the combination of a plunger compartment having an inlet adjacent its bottom, a water supply compartment communicating with said inlet, a horizontal stationary grate in the plunger compartment above the inlet and composed of removable sections, two of said sections having in their opposing edges semicircular recesses, a tubular guide divided longitudinally in two separable sections having adjacent their lower ends spaced flanges to receive the recessed edges of the said grate sections between them, whereby the guide will be removably secured in said grate, a plunger to reciprocate in the plunger compartment beneath the grate and across the upper portion of said inlet opening, an elevated drive shaft, and a plunger rod actuated from said shaft and extending through said tubular guide and connected to the plunger.

In testimony whereof I hereunto affix my signature in the presence of two witnesses.

MELVIN DOUBLEDEE.

Witnesses:
L. E. CRAIG,
F. M. CUMMINGS.